(12) United States Patent
Ahluwalia

(10) Patent No.: US 10,004,015 B2
(45) Date of Patent: *Jun. 19, 2018

(54) COMMUNICATIONS SYSTEM

(71) Applicant: NEC Corporation, Tokyo (JP)

(72) Inventor: Jagdeep Singh Ahluwalia, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/482,155

(22) Filed: Apr. 7, 2017

(65) Prior Publication Data

US 2017/0215120 A1    Jul. 27, 2017

Related U.S. Application Data

(63) Continuation of application No. 15/147,275, filed on May 5, 2016, now Pat. No. 9,713,052, which is a
(Continued)

(30) Foreign Application Priority Data

Aug. 17, 2009    (GB) .................................. 0914353.8

(51) Int. Cl.
*H04W 36/00*    (2009.01)
*H04W 36/08*    (2009.01)
(Continued)

(52) U.S. Cl.
CPC ........... *H04W 36/08* (2013.01); *H04L 5/0055* (2013.01); *H04W 36/0072* (2013.01);
(Continued)

(58) Field of Classification Search
CPC ..... H04L 5/001; H04L 5/0053; H04L 5/0098; H04L 5/0032; H04L 5/0035;
(Continued)

(56) References Cited

U.S. PATENT DOCUMENTS 6,400,952 B2    6/2002 Kim et al.
8,218,500 B2    7/2012 Kangude et al.
(Continued)

FOREIGN PATENT DOCUMENTS

CN    1248138 A    3/2000
CN    101009926 A    8/2007
(Continued)

OTHER PUBLICATIONS

Huawei, "Mobility Management Consideration for Carrier Aggregation", 3GPP TSG-RAN WG2 Meeting #66bis, R2-093933, Jul. 2009.
(Continued)

*Primary Examiner* — Nimesh Patel
(74) *Attorney, Agent, or Firm* — Finnegan, Henderson, Farabow, Garrett & Dunner, L.L.P.

(57) ABSTRACT

A target communications device receiving from a source communications device a notification that a user communications device is to be handed over from that source communications device, provides the source communications device with multiple component carrier information for use by the user communications device. The multiple component carrier information includes information indicating to the user communications device which of the multiple component carriers is to be used for initial access. The multiple component carrier information may be component carrier indexes. Communication devices may exchange component carrier indexes during a setup or updating procedure such as an X2 setup or updating procedure.

12 Claims, 7 Drawing Sheets

Related U.S. Application Data continuation of application No. 13/390,485, filed as application No. PCT/JP2010/063794 on Aug. 10, 2010, now Pat. No. 9,363,719.

(51) Int. Cl.
*H04W 92/20* (2009.01)
*H04W 74/04* (2009.01)
*H04W 74/08* (2009.01)
*H04L 5/00* (2006.01)
*H04L 27/26* (2006.01)

(52) U.S. Cl.
CPC ....... *H04W 36/0083* (2013.01); *H04W 74/04* (2013.01); *H04W 74/0833* (2013.01); *H04W 92/20* (2013.01); *H04L 27/2601* (2013.01); *H04W 76/27* (2018.02)

(58) Field of Classification Search
CPC ... H04L 5/0037; H04L 5/0055; H04L 5/0091; H04L 5/0007; H04L 5/0048; H04L 5/0057; H04L 5/006; H04L 1/0003; H04L 1/1812; H04L 2209/80; H04W 24/02; H04W 36/0083; H04W 36/08; H04W 36/14; H04W 36/0066; H04W 48/12; H04W 36/0055; H04W 36/04; H04W 36/30; H04W 52/143; H04W 72/0426; H04W 36/0016; H04W 36/0088; H04W 52/244; H04W 36/00
See application file for complete search history.

(56) References Cited

U.S. PATENT DOCUMENTS

| | | | |
|---|---|---|---|
| 2001/0016493 A1 | 8/2001 | Kim et al. | |
| 2002/0068571 A1 | 6/2002 | Ohlsson et al. | |
| 2004/0160919 A1 | 8/2004 | Balachandran et al. | |
| 2007/0047493 A1* | 3/2007 | Park | H04W 36/0055 370/331 |
| 2007/0086388 A1 | 4/2007 | Kang et al. | |
| 2007/0293224 A1* | 12/2007 | Wang | H04W 36/0055 455/436 |
| 2008/0070578 A1 | 3/2008 | Flore et al. | |
| 2009/0274096 A1 | 11/2009 | Fu | |
| 2009/0310563 A1 | 12/2009 | Chou et al. | |
| 2010/0220674 A1 | 9/2010 | Fu | |
| 2010/0254351 A1* | 10/2010 | Wang | H04J 11/0069 370/332 |
| 2010/0285809 A1 | 11/2010 | Lindstrom et al. | |
| 2010/0285831 A1 | 11/2010 | Jung et al. | |
| 2011/0200014 A1 | 8/2011 | Lee et al. | |
| 2011/0275374 A1 | 11/2011 | Narasimha et al. | |
| 2012/0002643 A1 | 1/2012 | Chung et al. | |
| 2012/0014257 A1 | 1/2012 | Ahluwalia et al. | |

FOREIGN PATENT DOCUMENTS

| | | |
|---|---|---|
| CN | 101505498 A | 8/2009 |
| WO | WO 2007/127800 A2 | 11/2007 |
| WO | WO 2009/057732 A1 | 5/2009 |
| WO | WO 2009/149665 A1 | 12/2009 |
| WO | WO 2010/121569 A1 | 10/2010 |

OTHER PUBLICATIONS

Ericsson, Changes to TS36.300 agreed in RAN3#61bis, R3-082837, 3GPP TSG-RAN WG3 Meeting #61bis, Sep.-Oct. 2008.
J. Chang et al., "A Fractional Soft Handover Scheme for 3GPP LTE-Advanced System", IEEE, 2009.
Ericsson, "Control plane aspects of carrier aggregation", 3GPP TSG-RAN WG2 #66, Tdoc R2-092958, May 2009.
Huawei, "Component Carrier Management with DRX Consideration in LTE-Advanced", 3GPP TSG-RAN WG2 Meeging #66bis, R2-093922, Jun.-Jul. 2009.
Japanese Office Action dated Mar. 30, 2016, by the Japanese Patent Office in corresponding Japanese Patent Application No. 2015-095315.
Chinese Office Action dated Mar. 16, 2015 and Search Report with an English Translation of the Search Report.
Japanese Office Action dated Aug. 27, 2014.
3GPP TS 36.413 V8.6.0 (Jun. 2009); $3^{rd}$ Generation Partnership Project; Technical Specification GroupRadio Access Network; Evolved Universal Terrestrial Radio Access Network (E-UTRAN); S1 Application Protocol (S1AP) (Release 8).
Chinese Office Action dated Dec. 26, 2013, with English translation.
Japanese Office Action dated Nov. 27, 2013.
"Handover for Carrier Aggregation", 3GPP TSG RAN WG2 Meeting #66bis R2-093722, Jun. 29, 2009, pp. 1-3, (previously submitted on Feb. 14, 2012).
"Downlink control structure for LTE-A", 3GPP TSG-RAN WG1 meeting %56 R1-090628, Feb. 9, 2009, pp. 15, Feb. 9-13, 2009, Athens, Greece.
"Carrier aggregation in Advanced E-UTRA", 3GPP TSG RAN WG1#53bis R1-082448, Jun. 20, 2008, pp. 1-4, Warsaw, Poland, Jun. 30-Jul. 4, 2008.
CMCC "Discussions on Carrier Aggregation in RAN 2", 3GPP DRAFT, R2-092411, $3^{rd}$ Generation Partnership Project (3GPP), Mobile Competence Centre; 650, Route des Lucioles; F-06921 Sophia-Antipolis Cedex; France; No. Seoul, Korea; Mar. 23, 2009, Mar. 23, 2009 (Mar. 23, 2009), XP050340129 [retrieved on Mar. 27, 2009].
ZRE: "Primary and Secondary PDCCHDesign for LTE-A" 3GPP Draft; R1-092227, $3^{rd}$ Generation Partnership Project (3GPP), Mobile Competence Centre; 650, Route des Lucioles; F-06921 Sophia-Antipolis Cedex; France; No. San Francisco, USA; May 4, 2009, May 4, 2009 (May 4, 2009) XP050339649 [retrieved on May 4, 2009].
International Search Report in PCT/JP2010/063794 dated Jan. 14, 2011 (English Translation Thereof).
CATT: "Handover for Carrier Aggregation", 3GPP DRAFT, R2-093722, $3^{rd}$ Generation Partnership Project (3GPP), Mobile Competence Centre; 650, Route des Lucioles; F-06921 Sophia-Antipolis Cedex; France; No. Los Angeles, USA; Jun. 23, 2009, Jun. 3, 2009 (Jun. 23, 2009), XP050351944 [retrieved on Jun. 23, 2009].
Ericsson et al "Carrier Aggregation and Mobility" $3^{rd}$ Generation Partnership Project (3GPP), Mobile Competence Centre; 650, Route des Lucioles; F-06921 Sophia-Antipolis Cedex; France; No. Los Angeles, USA; Jun. 23, 2009, Jun. 3, 2009 (Jun. 23, 2009), XP050351955 [retrieved on Jun. 23, 2009].
3GPP TS 36.300, V8.9.0 (Jun. 2009), Technical Specification, $3^{rd}$ Generation Partnership Project; Technical Specification Group Radio Access Network; Evolved Universal Terrestrial Radio Access (E-UTRA) and Evolved Universal Terrestrial Radio Access Network (E-UTRAN) Overall description Stage 2 (Release 8).
3GPP TS 36.423, V8.6.0 (Jun. 2009), Technical Specification, $3^{rd}$ Generation Partnership Project; Technical Specification Group Radio Access Network; Evolved Universal Terrestrial Radio Access Network (E-UTRAN) X2 application protocol (X2AP) (Release 8).
3GPP TS 36.814 V0.4.1, (Feb. 2009), Technical Report, $3^{rd}$ Generation Partnership Project; Technical Specification Group Radio Access Network; Further Advancements for E-UTRA Physical Layer Aspects (Release 9).
Japanese Office Action dated May 31, 2017 for counterpart Japanese Application No. 2016-126405.
Huawei, Intra LTE-A-UE Hand over Procedure inter-eNB for CA, 3GPP TSG RAN WG2 Meeting #67, R2-094731, pp. 2-7E, Aug. 2009.
Extended European Search Report issued by the European Patent Office in counterpart European Patent Application No. 17154706.0, dated Apr. 18, 2017.
3GPP TS 36.300, V9.0.0 (Jun. 2009), Technical Specification, $3^{rd}$ Generation Partnership Project; Technical Specification Group Radio Access Network; Evolved Universal Terrestrial Radio Access

(56) References Cited

OTHER PUBLICATIONS (E-UTRA) and Evolved Universal Terrestrial Radio Access Network (E-UTRAN) Overall description; Stage 2, (Release 9) (Jun. 2009).

Notification of First Office Action issued by The State Intellectual Property Office of P.R. China in counterpart Chinese Patent Application No. 201510781199.0, dated Mar. 5, 2018.

Search Report issued by The State Intellectual Property Office of P.R. China in counterpart Chinese Patent Application No. 201510781199.0, dated Mar. 5, 2018.

* cited by examiner

COMMUNICATIONS SYSTEM

CROSS-REFERENCE TO RELATED PATENT APPLICATIONS

This application is a continuation of U.S. patent application Ser. No. 15/147,275, filed May 5, 2016, which is a continuation of U.S. patent application Ser. No. 13/390,485, filed Feb. 14, 2012 (now U.S. Pat. No. 9,363,719), which is a National Stage Entry of International Application No. PCT/JP2010/063794, filed Aug. 10, 2010, which claims priority from United Kingdom Patent Application No. 0914353.8, filed Aug. 17, 2009. The entire contents of the above-referenced applications are expressly incorporated herein by reference.

TECHNICAL FIELD

The present invention relates to communications devices, particularly but not exclusively devices operating according to the 3GPP standards or equivalents or derivatives thereof. The invention has particular but not exclusive relevance to the impacts of carrier aggregation that is to be used in LTE-Advanced (Long Term Evolution-Advanced) as currently defined in 3GPP standards documentation TR 36.814.

BACKGROUND ART

With LTE Rel 8, a transmission hand of 20 MHz was defined. In LTE-Advanced carrier aggregation will be used to support system bandwidths up to 100 MHz. This involves splitting the system bandwidth into five 20 MHz sub-bands, each centred on a respective component carrier. In order to be backwards compatible with LTE Rel 8 User Equipment (UEs), at least one of those sub-bands has to be LTE Rel 8 compliant.

It has been proposed for LTE-Advanced that, during handover, the target eNB (that is the base station of the cell to which the LTE is moving), will tell the UE (via the source eNB, that is the base station of the cell in which the UE is currently located) which Component Carriers (CCs) the UE will be assigned to in the target cell. Thus, it has been proposed that at intra-LTE handover multiple Carrier Components (CCs) will be configured in the handover command for usage after the handover. This is to avoid the need for signalling this information to the UE after it arrives in the target cell so that the target eNB does not have to configure additional Component Carriers to the UE after the handover.

DISCLOSURE OF INVENTION

In one aspect, the present invention provides a communications device that is configured to communicate to a UE which of a plurality of carrier components (CCs) configured in a handover command for usage after the handover should be used for initial access to facilitate initial access of the UE at handover. Dedicated preamble for the UE may be provided from the same component carrier.

In one aspect, the present invention provides a method performed by a target communications device, the method comprising: receiving from a source communications device a notification that a user communications device is to be handed over from that source communications device; and providing for the user communications device multiple component carrier information including information indicating to the user communications device which of the multiple component carriers is to be used for initial access.

In another aspect, the present invention provides a method performed by a source communications device, the method comprising: supplying to a target communications device a notification that a user communications device is to be handed over to that target communications device; and receiving from the target communications device multiple component carrier information for the user communications device, the multiple component carrier information including information indicating to the user communications device which of the multiple component carriers is to be used for initial access.

In another aspect, the present invention provides a method performed by a user communication device, comprising: receiving from a communications device multiple component carrier information including information indicating to the user communications device which of the multiple component carriers is to be used for initial access; and initiating initial access using the identified component carrier.

In another aspect, the present invention provides a target communications device, the target communications device comprising: a receiver to receive from a source communications device a notification that a user communications device is to be handed over from that source communications device; and a provider to provide for the user communications device multiple component carrier information including information indicating to the user communications device which of the multiple component carriers is to be used for initial access.

In another aspect, the present invention provides a source communications device, the source communications device comprising: a supplier to supply to a target communications device a notification that a user communications device is to be handed over to that target communications device; and a receiver to receive from the target communications device multiple component carrier information for the user communications device, the multiple component carrier information including information indicating to the user communications device which of the multiple component carriers is to be used for initial access.

In another aspect, the present invention provides a user communication device, comprising: a receiver to receive from a communications device multiple component carrier information including information indicating to the user communications device which of the multiple component carriers is to be used for initial access; and an initiator to initiate initial access with a target communications device using the identified component carrier.

The multiple component carrier information may be provided to the source communications device for transmittal to the user communications device.

In an embodiment, the notification is a handover command. The information indicating which of the multiple component carriers is to be used for initial access by the user communications device may be provided in a handover request acknowledge message to the source communications device for communication to the user communications device. The handover request acknowledge message may include a transparent container to be sent to the user communications device, for example sent as a Radio Resource Control message.

In an embodiment, the multiple component carrier information indicates that a dedicated preamble is allocated from the component carrier to be used for initial access.

In an embodiment or embodiments, the component carrier information comprises a component carrier index for each carrier.

Component carrier information may be exchanged with one or more neighbouring communications devices, for example during a setup or updating procedure such as an X2 interface setup or updating procedure, with that neighbouring communications device.

The carrier component information may be used for signalling, for example for signalling on the X2 and Uu interfaces.

In another aspect, the present invention provides a method performed by a target communications device, the method comprising: receiving from a source communications device a notification that a user communications device is to be handed over from that source communications device; and providing for the user communications device multiple component carrier information comprising a component carrier index for each component carrier.

In another aspect, the present invention provides a method performed by a source communications device, the method comprising: supplying to a target communications device a notification that a user communications device is to be handed over from that source communications device; and receiving for the user communications device multiple component carrier information comprising a component carrier index for each carrier.

In another aspect, the present invention provides a method performed by a communications device, the method comprising the communications device using carrier components indexes for signalling purposes while at least one of configuring, activating and deactivating multiple carrier components.

In another aspect, the present invention provides a method performed by a communications device, the method comprising the communications device supplying multiple component carrier information to a neighbouring communications device and receiving multiple component carrier information from a neighbouring communications device during setup or updating of a communication interface such as an X2 interface with that neighbouring communications device.

In another aspect, the present invention provides a target communications device, the target communications device comprising: a receiver to receive from a source communications device a notification that a user communications device is to be handed over from that source communications device; and a provider to provide for the user communications device multiple component carrier information comprising a component carrier index for each carrier.

In another aspect, the present invention provides a source communications device, the source communications device comprising: a supplier to supply to a target communications device a notification that a user communications device is to be handed over from that source communications device; and a receiver to receive for the user communications device multiple component carrier information comprising a component carrier index for each carrier.

In another aspect, the present invention provides a communications device comprising a supplier to supply multiple component carrier information to a neighbouring communications device and a receiver to receive multiple component carrier information from a neighbouring communications device during setup or updating of a communication interface such as an X2 interface with that neighbouring communications device.

In one aspect, the present invention provides a communications device that provides a component carrier index which both a UE and the communications device can use for the signaling purposes, for example while at least one of configuring, activating and deactivating multiple carrier components.

In an embodiment, a component carrier index is used to indicate to a UE the component carrier on which the initial access is to be performed in the target cell after handover.

In one aspect, the present invention provides a communications device that exchanges component carrier information with a neighboring communications device, that is a communications device of a neighboring cell in a cellular network, so that a component carrier index provided to a UE is known also to the neighboring communications device.

In an embodiment, component carrier information of neighboring communications device is exchanged during the setup or updating of the X2 interface between the two communications devices and the carrier component index is known in the neighboring communications device. These carrier component indexes can be used for signaling on the X2 interface and on the air interface between the UTRAN and the UE (the Uu interface).

In an embodiment, a target communications device receiving from a source communications device a notification a user communications device is to be handed over from that source communications device, provides the source communications device with information for multiple component carriers (multiple component carrier information) for use by the user communications device. The multiple component carrier information includes information indicating to the user communications device which of the multiple component carriers is to be used for initial access. The multiple component carrier information may be component carrier indexes. Communication devices may exchange component carrier indexes during a setup or updating procedure such as an X2 setup or updating procedure.

The invention provides, for all methods disclosed, corresponding computer programs or computer program products for execution on corresponding equipment, the equipment itself (user equipment, communication devices or nodes, or components thereof) and methods of updating the equipment.

BRIEF DESCRIPTION OF THE DRAWINGS

Exemplary embodiments of the invention will now be described, by way of example, with reference to the accompanying drawings, in which.

BEST MODE FOR CARRYING OUT THE INVENTION

Overview

Figure 1:
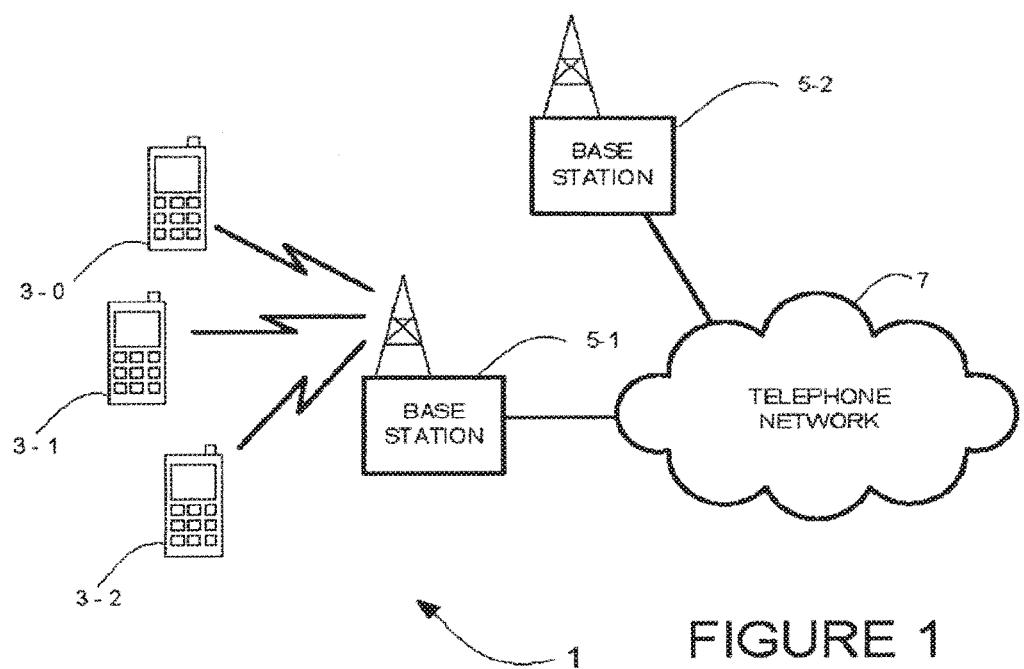
FIG. 1 schematically illustrates a mobile telecommunication system of a type to which the invention is applicable.

FIG. 1 schematically illustrates a mobile (cellular) telecommunication system 1 in which a user of a UE (User Equipment, that is a mobile telephone (otherwise referred to as cellular telephones or cell phones) or other device capable of communicating over a mobile (cellular) telecommunication system) 3-0, 3-1, and 3-2 can communicate with a user of another UE (shown or not shown) via one of the base stations 5-1 or 5-2 and a telephone network 7. The mobile (cellular) telecommunication system 1 is made up of a number of cells or geographical areas, each of which has a base station 5. A UE within a cell may communicate with that cell's base station and UEs may move between neighbouring cells which requires a handover process to hand over communication with the UE from the base station of its current cell (the source base station) to the base station of the cell to which it is moving (the target base station).

A number of uplink and downlink communications resources (sub-carriers, time slots etc) are available for the wireless link between the UEs 3 and the base stations 5. In this embodiment, a base station 5 allocates downlink resources to a UE 3 depending on the amount of data to be sent to the UE 3. Similarly, a base station 5 allocates uplink resources to a UE 3 depending on the amount and type of data that the UE 3 has to send to the base station 5.

In this embodiment, the system bandwidth is divided into five 20 MHz sub-bands, each being carried by a respective component carrier. The base station 5 is operable to allocated resources for each UE 3 on one or more of the component carriers, depending on the capability of the UE 3 concerned and the amount of data to be transmitted between the base station 5 and that UE 3. The UEs 3 have transceiver circuitry that can receive and transmit signals on the different component carriers and when the UE 3 is not scheduled to use a particular component carrier, it can power down the corresponding transceiver circuitry to conserve battery power.

LTE Sub-Frame Data Structure

In the access scheme and general frame structure agreed for LTE Rel 8, an Orthogonal Frequency Division Multiple Access (OFDMA) technique is used for the downlink to allow the UEs 3 to receive data over the air interface with the base station 5. Different sub-carriers are allocated by the base station 5 (for a predetermined amount of time) to each UE 3 depending on the amount of data to be sent to the UE 3. These are referred to as physical resource blocks (PRBs) in the LTE specifications. PRBs thus have a time and frequency dimension. To do this, the base station 5 dynamically allocates PRBs for each device that it is serving and signals the allocations for each sub-frame (TTI) to each of the scheduled UEs 3 in a control channel.

Figure 2A:
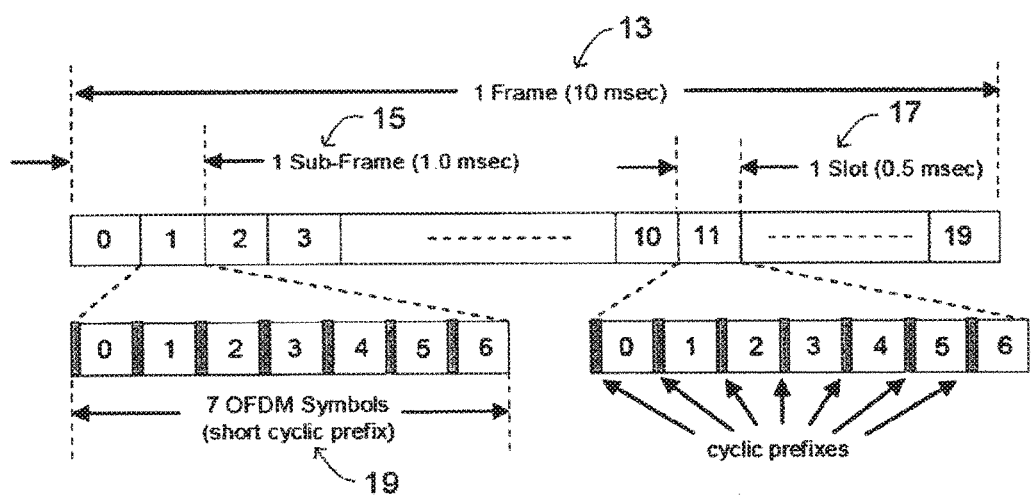
FIG. 2a schematically illustrates a generic frame structure used in communications over the wireless links of the system shown in FIG. 1.
Figure 2B:
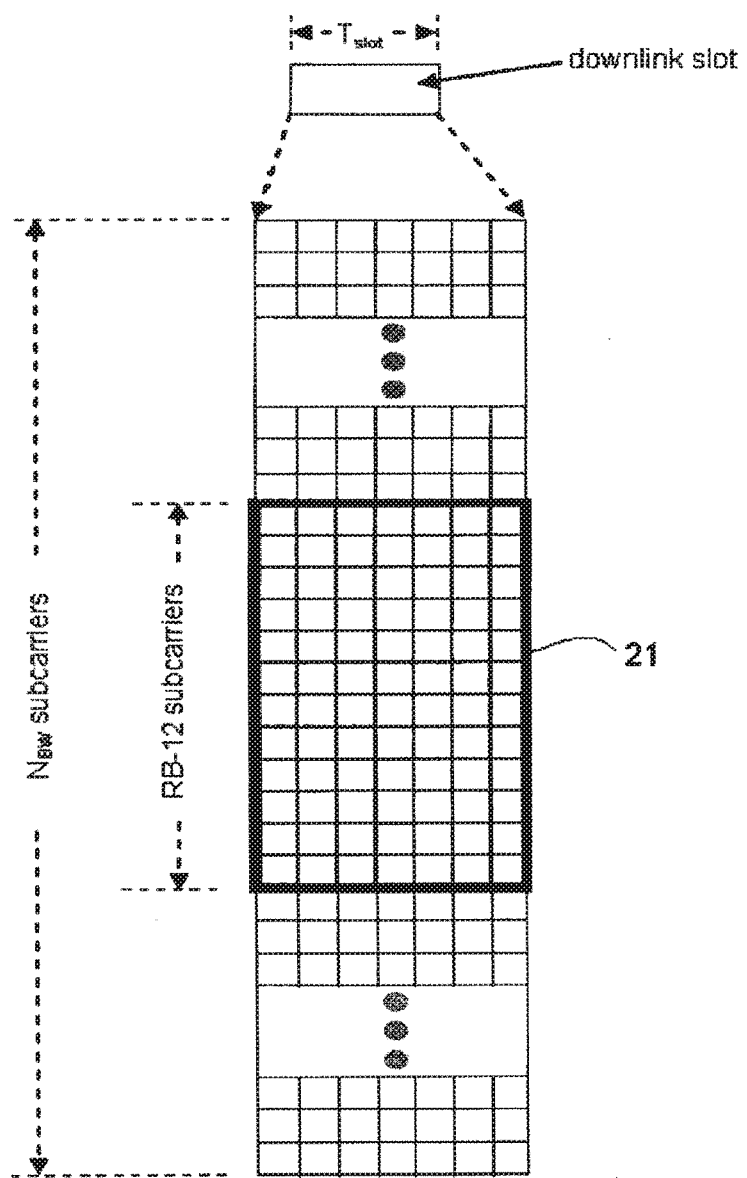
FIG. 2b schematically illustrates the way in which the frequency subcarriers are divided into resource blocks and the way that a time slot is divided into a number of OFDM symbols.

FIG. 2a illustrates a generic frame structure agreed for LTE Rel 8 communications over the air interface with the base station 5. As shown, one frame 13 is 10 msec (millisecond) long and comprises ten sub-frames 15 of 1 msec duration (known as a Transmission Time Interval (TTI)). Each sub-frame or TTI comprises two slots 17 of 0.5 msec duration. Each slot 17 comprises either six or seven OFDM symbols 19, depending on whether the normal or extended cyclic prefix (CP) is employed. The total number of available sub-carriers depends on the overall transmission bandwidth of the system. The LTE specifications define parameters for system bandwidths from 1.4 MHz to 20 MHz and one PRB is currently defined to comprise 12 consecutive subcarriers for one slot 17. A PRB over two slots is also defined by the LTE specifications as being the smallest element of resource allocation assigned by the base station scheduler. These sub-carriers are then modulated onto a component carrier to up-convert the signal to the desired transmission bandwidth. The transmitted downlink signal thus comprises $N_{BW}$ subcarriers for a duration of $N_{symb}$ OFDM symbols. It can be represented by a resource grid as illustrated in FIG. 2b. Each box in the grid represents a single sub-carrier for one symbol period and is referred to as a resource element. As shown, each PRB 21 is formed from 12 consecutive sub-carriers and (in this case) seven symbols for each subcarrier; although in practice the same allocations are made in the second slot 17 of each sub-frame 15 as well.

At the start of each sub-frame 15, the base station 5 transmits a PDCCH (Physical Downlink Control Channel) over the first three symbols. The remaining symbols form the PDSCH (Physical Downlink Shared CHannel) which is used to carry the downlink user data for the UEs 3. The PDCCH channel includes, among other things, data for each of the UEs 3, indicating if the UE 3 is scheduled for receiving downlink data in that sub-frame or is scheduled for uplink transmission in that sub-frame; and if so, data identifying the PRBs to be used for receiving the downlink data or for transmitting the uplink data.

LTE-Advanced

In the proposed LTE-Advanced system, a number of separate sub-bands will be provided in order to support wider transmission bandwidths, each of the sub-bands will at least be similar in structure to the LTE structure discussed above. The sub-carriers for each sub-band will be modulated onto a separate component carrier so that the transmitted sub-bands are contiguous or non-contiguous with each other. This is known as carrier aggregation. If there are five sub-bands each 20 MHz wide, then the total system bandwidth will be 100 MHz. In the following description, the terms sub-band and component carrier will be used interchangeably.

Although LTE-Advanced UEs 3 will support bandwidths up to 100 MHz, they may not transmit/receive in the whole spectrum at any given time. In order to allow the UEs 3 to save battery power the system is preferably arranged so that the UEs 3 monitor one or a subset of the component carriers to start with; and then the base station scheduler, based on the activity of the UE 3, can direct the UE 3 to monitor a different (although perhaps overlapping) subset of the component carriers.

Base Station

Figure 3:
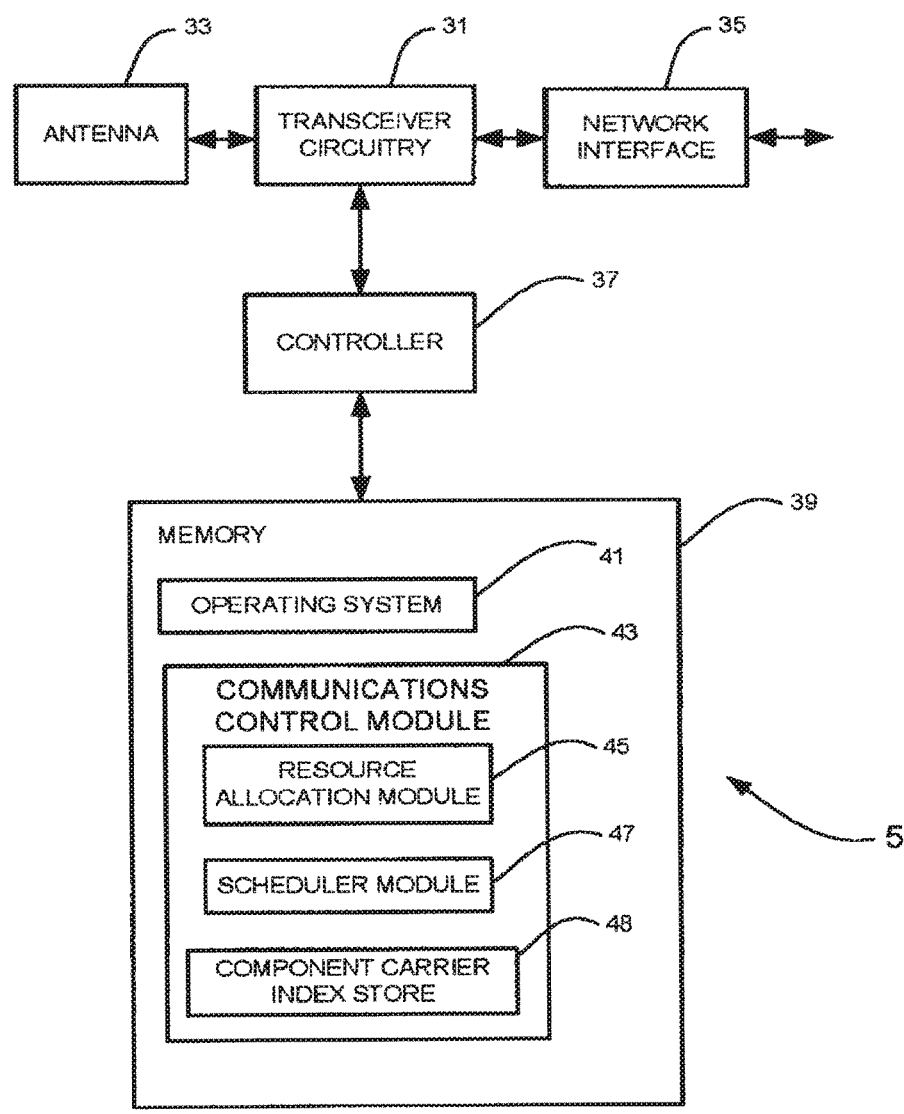
FIG. 3 schematically illustrates a base station forming part of the system shown in FIG. 1.

FIG. 3 is a block diagram illustrating the main components of each of the base stations 5 shown in FIG. 1. As shown, each base station 5 includes transceiver circuitry 31 to transmit signals to and to receive signals from the UEs 3 via one or more antennae 33 and to transmit signals to and to receive signals from the telephone network 7 via a network interface 35. A controller 37 is provided to control the operation of the transceiver circuitry 21 in accordance with software stored in memory 39. The software includes, among other things, an operating system 41 and a communications control module 43 having a resource allocation module 45 and a scheduler module 47. The communications control module 43 is operable to control the generation of the sub-frames in the different sub-bands in which the uplink and downlink data is transmitted from/to the UEs 3. The resource allocation module 45 is operable to allocate the resource blocks in the different sub-bands to be used by the transceiver circuitry 31 in its communications with each of the UEs 3, depending on the amount of data to be transmitted between the base station 5 and the UEs 3. The scheduler module 47 is operable to schedule the times for the transmission of the downlink data to the UEs 3 and the times for the UE 3 to transmit its uplink data to the base station 5. The communications control module 43 is responsible: for signalling, to each of the UEs 3, data identifying which component carriers the UE should be monitoring when in the Idle mode; and for moving the UEs 3 between the different component carriers when in RRC Connected mode; and for defining the DRX patterns used for controlling the times when the UEs 3 can switch off its transceiver circuitry.

User Equipment (UE)

Figure 4:
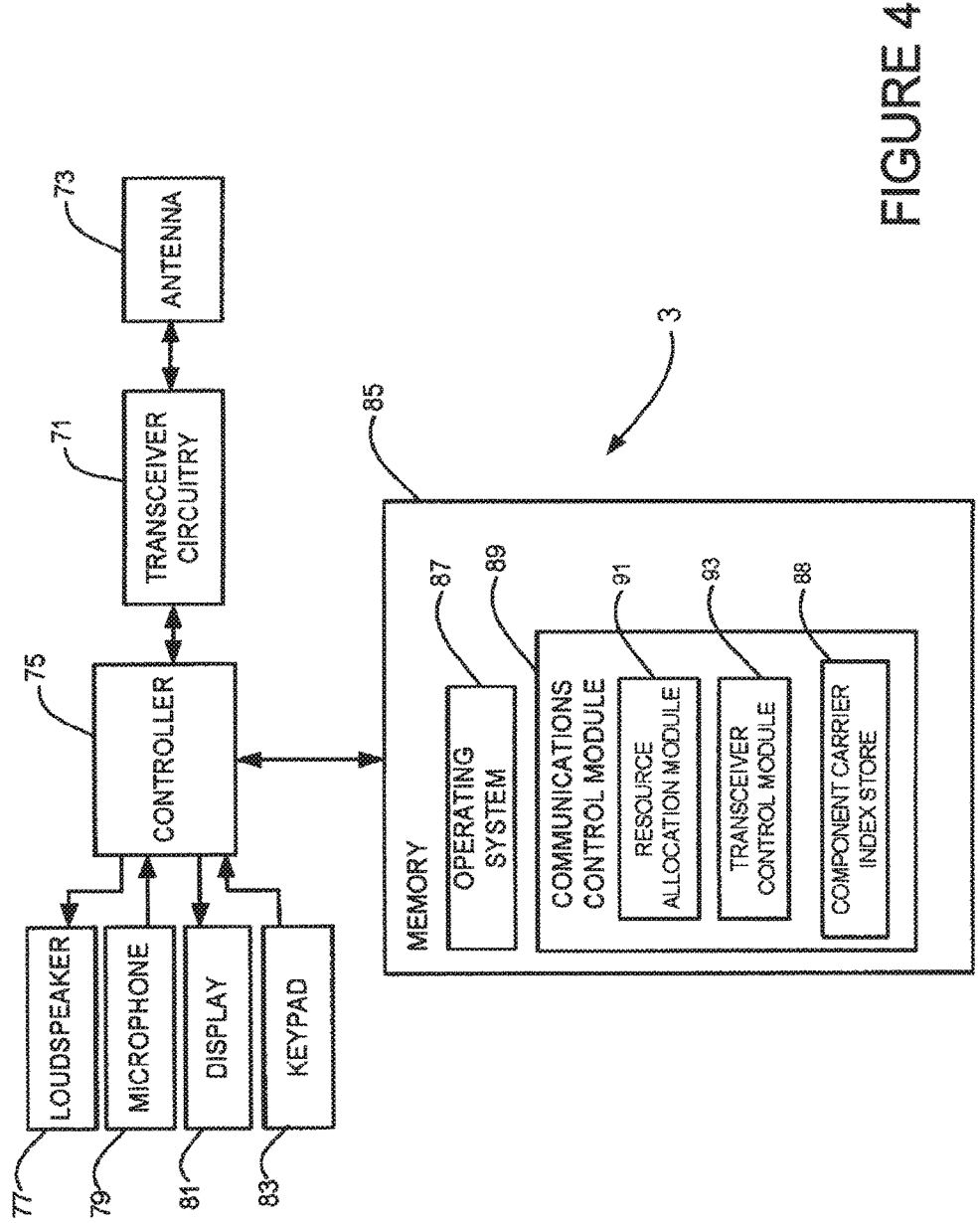
FIG. 4 schematically illustrates a mobile telephone (UE) forming part of the system shown in FIG. 1.

FIG. 4 is a block diagram illustrating the main components of each of the UEs 3 shown in FIG. 1. As shown, the UEs 3 include transceiver circuitry 71 that is operable to transmit signals to and to receive signals from the base station 5 via one or more antennae 73. As shown, the UE 3 also includes a controller 75 which controls the operation of the UE 3 and which is connected to the transceiver circuitry 71 and to a loudspeaker 77, a microphone 79, a display 81, and a keypad 83. The controller 75 operates in accordance with software instructions stored within memory 85. As shown, these software instructions include, among other things, an operating system 87 and a communications control module 89 that includes a resource allocation module 91 and a transceiver control module 93. The communications control module 89 is operable to control communications with the base station 5 and during the Idle mode monitors an anchor component carrier. The resource allocation module is responsible for identifying the resources on which uplink should be transmitted and on which downlink data is to be received in the different sub-bands. The transceiver control module 93 is responsible for identifying the parts of the transceiver circuitry 71 that can be switched off at the current instance using, for example, DRX configuration data received from the base station 5 or using knowledge of the sub-bands that the UE 3 is to monitor.

In the above description, the base stations 5 and the UEs 3 are described for ease of understanding as having a number of discrete modules (such as the resource allocation modules, scheduler module, transceiver control module etc.). Whilst these modules may be provided in this way for certain applications, for example where an existing system has been modified to implement the invention, in other applications, these modules may be built into the overall operating system or code and so these modules may not be discernible as discrete entities.

Figure 5:
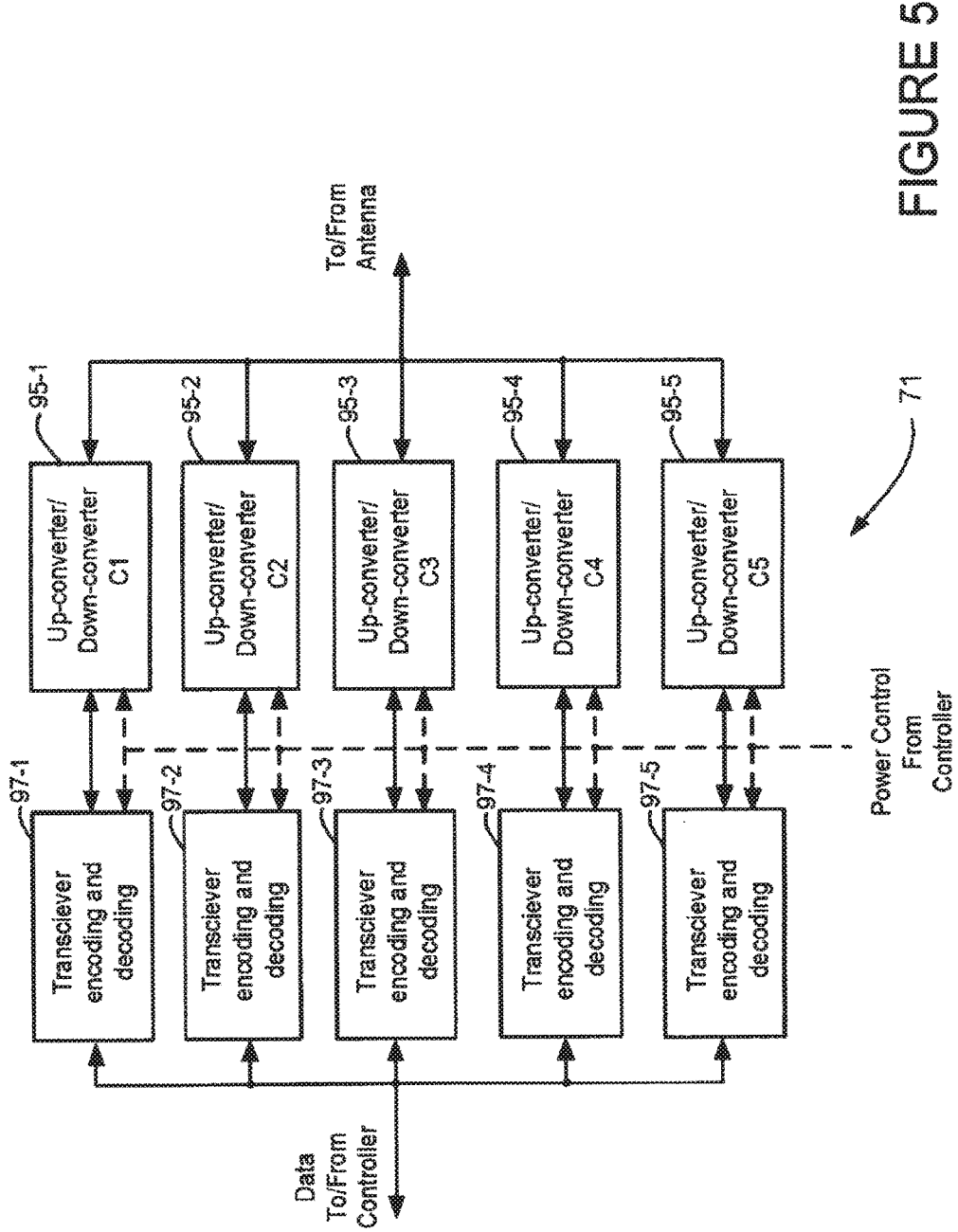
FIG. 5 is a block diagram illustrating the main components of transceiver circuitry forming part of the mobile telephone shown in FIG. 4.

As mentioned above, LTE-Advanced UEs 3 have transceiver circuitry 71 that can transmit and receive data on a number of different component carriers. FIG. 5 is a block diagram illustrating suitable transceiver circuitry 71 that may be used. As shown, the transceiver circuitry includes five up-converter/down-converter circuits 95-1 to 95-5, one for each of the five sub-bands, for modulating and demodulating the sub-carriers onto the corresponding component carrier (C1 to C5). The transceiver circuitry 71 also includes five encoding/decoding circuits 97-1 to 97-5 for encoding and decoding the uplink data and downlink data respectively in each of the five sub-bands. The encoding/decoding circuits 97 receive the uplink data from, and pass the decoded downlink data to, the controller 75. The controller 75 also supplies individual power control signals (via the dashed signal lines) to the encoding/decoding circuits 97 and to the up-converter circuits 95, so that individual circuits can be powered down when not needed and so that they can all be powered down when none of the circuits are needed (for example when the UE 3 enters its sleep mode).

The communications control module 43 (FIG. 3) of the target base station is configured to indicate to the UE which of the multiple component carriers (five in the example above) configured for that UE is to be used by that UE for initial access and the dedicated preamble allocated from that same one of the multiple component carriers, so that, after the handover, the target base station does not have to configure additional component carriers to the UE and does not have to identify to the UE which of the multiple component carriers is to be used for initial access.

In an example, the target base station may provide the Component Carrier Information to a UE by providing the UE with a Component Carrier Index for each of the multiple carrier components configured for that UE. The UE and the base station may use these indexes to identify a carrier component, for example while configuring, activating and deactivating one or more of the multiple carrier components. These indexes may be stored in a component carrier index store 48 of the communications control module 43 of the base station and a component carrier index store 88 of the communications control module 89 of the UE 3.

Figure 6:
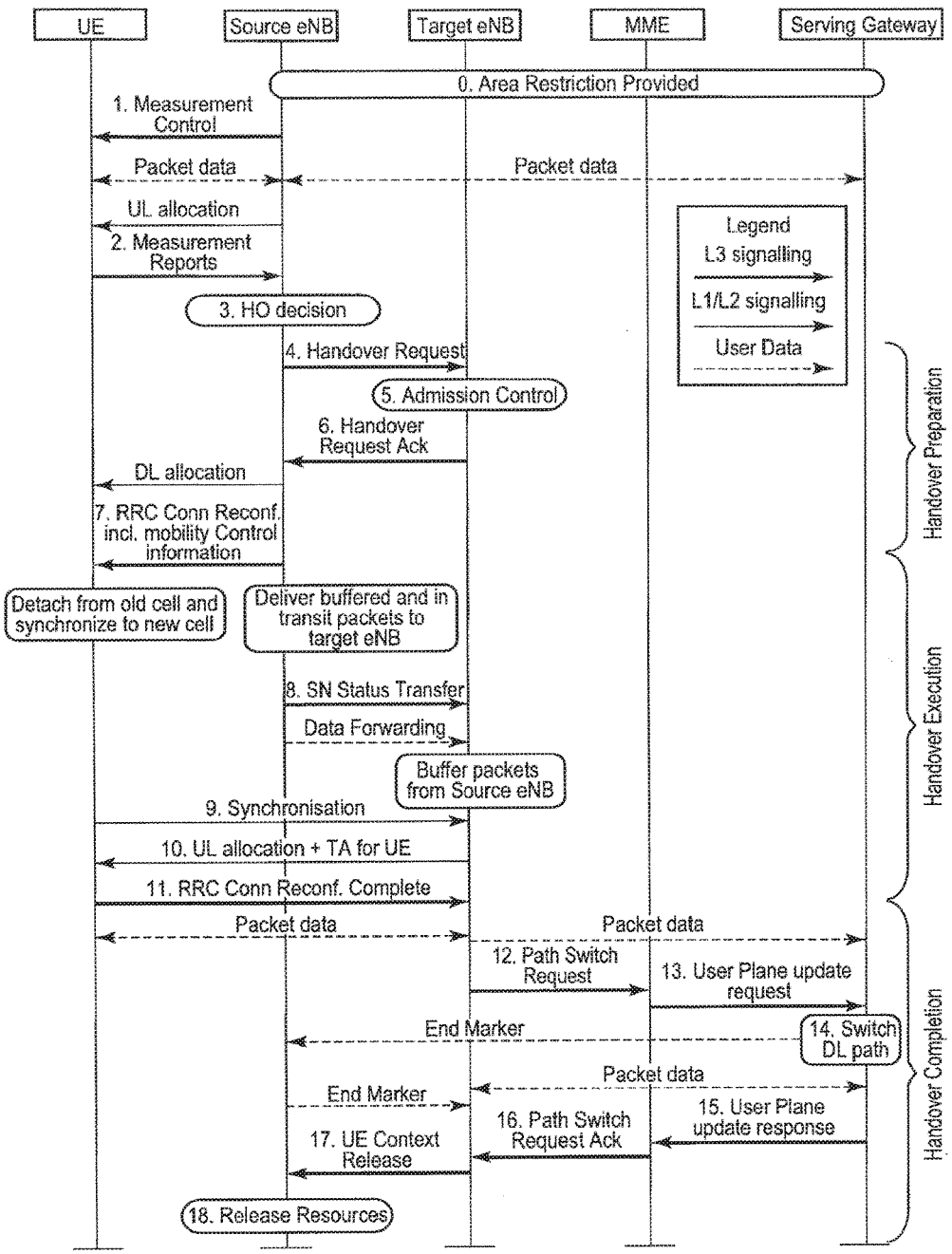
FIG. 6 illustrates one example of a handover process.

FIG. 6 illustrates the proposed intra-MME/Serving Gateway Handover (HO) procedure and shows C-Plane Handover (HO) Signalling with a single carrier where the communications control module 43 (FIG. 3) of the target base station is configured to indicate to the UE which of the multiple component carriers configured for that UE is to be used by that UE for initial access.

The HO procedure is performed without EPC involvement, i.e. preparation messages are directly exchanged between the eNBs. The release of the resources at the source side during the HO completion phase is triggered by the eNB.

0 The UE context within the source eNB (eNodeB) contains information regarding roaming restrictions which were provided either at connection establishment or at the last TA update.

1 The source eNB configures the UE measurement procedures according to the area restriction information. Measurements provided by the source eNB may assist the function controlling the UE's connection mobility.

2 UE is triggered to send MEASUREMENT REPORT by the rules set by i.e. system information, specification etc.

3 Source eNB makes a decision based on MEASUREMENT REPORT and RRM information to hand off UE.

4 The source eNB issues a HANDOVER REQUEST message to the target eNB passing necessary information to prepare the HO at the target side (UE X2 signalling context reference at source eNB, UE S1 EPC signalling context reference, target cell ID, $K_{eNB^*}$, RRC context including the C-RNTI of the UE in the source eNB, AS-configuration, E-RAB context and physical layer ID of the source cell+MAC for possible RLF recovery). UE X2/UE S1 signalling references enable the target eNB to address the source eNB and the EPC. The E-RAB context includes necessary RNL and TNL addressing information, and QoS profiles of the E-RABs.

5 Admission Control may be performed by the target eNB dependent on the received E-RAB QoS information to increase the likelihood of a successful HO, it the resources can be granted by target eNB. The target eNB configures the required resources according to the received E-RAB QoS information and reserves a C-RNTI and optionally a RACH preamble. The AS-configuration to be used in the target cell can either be specified independently (i.e. an "establishment") or as a delta compared to the AS-configuration used in the source cell (i.e. a "reconfiguration").

6 Target eNB prepares HO with L1/L2 and sends the HANDOVER REQUEST ACKNOWLEDGE to the source eNB. The HANDOVER REQUEST ACKNOWLEDGE message includes a transparent container to be sent to the UE as an RRC message to perform the handover. The container includes a new C-RNTI, target eNB security algorithm identifiers for the selected security algorithms, may include a dedicated RACH preamble, and possibly some other parameters i.e. access parameters, SIBs, etc. For LTE Advanced, this message will carry multiple carrier configuration information and the information on which carrier to be used for initial access and the dedicate preamble from the same carrier. The HANDOVER REQUEST ACKNOWLEDGE message may also include RNL/TNL information for the forwarding tunnels, if necessary, NOTE: As soon as the source eNB receives the HANDOVER REQUEST ACKNOWLEDGE, or as soon as the transmission of the handover command is initiated in the downlink, data forwarding may be initiated. Steps 7 to 16 provide means to avoid data loss during HO and are further detailed in 10.1.2.1.2 and 10.1.2.3 of the 3GPP Specifications 36.300 EUTRAN Overall Description Stage 2.

7 The target eNB generates the RRC message to perform the handover, i.e RRC Connection Reconfiguration message including the mobilityControl Information, to be sent by the source eNB towards the UE. The source eNB performs the necessary integrity protection and ciphering of the message. The UE receives the RRC Connection Reconfiguration message with necessary parameters (i.e. new C-RNTI, target eNB security algorithm identifiers, and optionally dedicated RACH preamble, target eNB SIBs, etc.) and is commanded by the source eNB to perform the HO. The UE does not need to delay the handover execution for delivering the HARQ/ARQ responses to source eNB.

8 The source eNB sends the SN STATUS TRANSFER message to the target eNB to convey the uplink PDCP SN receiver status and the downlink PDCP SN transmitter status of E-RABs for which PDCP status preservation applies (i.e. for RLC AM). The uplink PDCP SN receiver status includes at least the PDCP SN of the first missing UL SDU and may include a bit map of the receive status of the out of sequence UL SDUs that the UE needs to retransmit in the target cell, if there are any such SDUs. The downlink PDCP SN transmitter status indicates the next PDCP SN that the target eNB shall assign to new SDUs, not having a PDCP SN yet. The source eNB may omit sending this message if none of the E-RABs of the UE shall be treated with PDCP status preservation.

9 After receiving the RRC Connection Reconfiguration message including the mobilityControl Information, UE performs synchronisation to target eNB and accesses the target cell via RACH, following a contention-free procedure if a dedicated RACH preamble was indicated in the mobility Control Information, or following a contention-based procedure if no dedicated preamble was indicated. UE derives target eNB specific keys and configures the selected security algorithms to be used in the target cell.

10 The target eNB responds with UL allocation and timing advance.

11 When the UE has successfully accessed the target cell, the UE sends the RRC Connection Reconfiguration Complete message (C-RNTI) to confirm the handover, along with an uplink Buffer Status Report, whenever possible, to the target eNB to indicate that the handover procedure is completed for the UE. The target eNB verifies the C-RNTI sent in the RRC Connection Reconfiguration Complete message. The target eNB can now begin sending data to the UE.

12 The target eNB sends a PATH SWITCH message to MME to inform that the UE has changed cell.

13 The MME sends an UPDATE USER PLANE REQUEST message to the Serving Gateway.

14 The Serving Gateway switches the downlink data path to the target side. The Serving Gateway sends one or more "end marker" packets on the old path to the source eNB and then can release any U-plane/TNL resources towards the source eNB.

15 Serving Gateway sends an UPDATE USER PLANE RESPONSE message to MME.

16 The MME confirms the PATH SWITCH message with the PATH SWITCH ACKNOWLEDGE message.

17 By sending UE CONTEXT RELEASE, the target eNB informs success of HO to source eNB and triggers the release of resources by the source eNB. The target eNB sends this message after the PATH SWITCH ACKNOWLEDGE message is received from the MME.

18 Upon reception of the UE CONTEXT RELEASE message, the source eNB can release radio and C-plane related resources associated to the DE context. Any ongoing data forwarding may continue.

As set out above, for LTE Advanced, the HANDOVER REQUEST ACKNOWLEDGE message will carry multiple carrier component configuration information and the information on which carrier component to be used for initial access and the dedicate preamble from the same carrier component. This information may use carrier component indexes as discussed above to identify the different carrier components.

Figure 7:
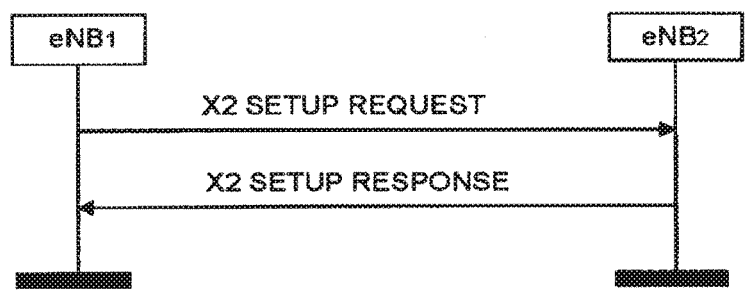
FIG. 7 illustrates an X2 set up procedure.

In an example, the communications control modules 43 of the base stations 5 are configured to enable Component Carrier Information, for example the indexes mentioned above, to be exchanged between the two base stations during a communications setup or updating procedure, in this example an X2 setup or updating procedure, so that these carrier component indexes can be used be for signaling, for signaling on the X2 and Uu interfaces in this example. FIG. 7 illustrates a successful operation.

The X2 setup procedure is described in sections 8.3.3.1 and 8.3.3.2 of 36.423 of the 3GPP Specifications. FIG. 7 illustrates a successful setup procedure.

The purpose of the X2 setup procedure is to exchange application level configuration data needed for two base stations to intemperate correctly over the X2 interface. This procedure erases any existing application level configuration data in the two base stations and replaces it by the one received. This procedure also resets the X2 interface as a Reset procedure would do. The procedure uses non UE-associated signalling.

Thus, in this setup procedure, a base station (eNB1 in FIG. 7) initiates the X2 setup procedure by sending an X2 SETUP REQUEST message to a candidate base station (eNB2 in FIG. 7). The candidate base station eNB replies with the X2 SETUP RESPONSE message. The initiating base station eNB1 transfers a list of served cells and, if available, a list of supported GU Group Ids to the candidate base station eNB2. The candidate base station eNB2 replies with a list of its served cells and includes, if available, a list of supported GU Group Ids in the reply.

The initiating base station eNB1 may include Neighbour Information IE in the X2 SETUP REQUEST message. The candidate base station eNB2 may also include the Neighbour Information IE in the X2 SETUP RESPONSE message. The Neighbour Information IE only includes E-UTRAN cells that are direct neighbours of cells in the reporting eNB, where a direct neighbour of one cell of eNB2 may be any cell belonging to an eNB that is a neighbour of that eNB2 cell e.g. even if the cell has not been reported by a UE.

In this example, Component Carrier Information is included in the X2 SETUP REQUEST and X2 SETUP RESPONSE messages and so is exchanged during the X2 setup procedure. Generally this Component Carrier Information will be Component Carrier Indexes which can thus be used for signalling on the X2 and Uu interfaces.

Carrier index information can also be included in X2 ENB CONFIGURATION UPDATE and ENB CONFIGURATION UPDATE ACKNOWLEDGE in case the new carrier is added or existing one deleted.

In an embodiment, a target communications device 5 receiving from a source communications device 5 a notification that a user communications device 3-0, 3-1, 3-2 is to be handed over from that source communications device, provides the source communications device with multiple component carrier information for use by the user communications device. The multiple component carrier information includes information indicating to the user communications device which of the multiple component carriers is to be used for initial access. The multiple component carrier information may be component carrier indexes. Communication devices may exchange component carrier indexes during a setup procedure such as an X2 setup procedure, which indexes can then be used for signalling on the X2 and Uu interfaces.

Modifications and Alternatives

As those skilled in the art will appreciate, a number of modifications and alternatives can be made to the above-described embodiments whilst still benefiting from the inventions embodied therein. By way of illustration only a number of these alternatives and modifications will now be described. These alternatives and modifications may be used alone or in any combination.

The examples described above indicate that there are five carrier components for LTE-Advanced. It will of course be appreciated that this is for compliance with LTE-Advanced and that the number of carrier components could be fewer or less. The features described above may be used alone or in combination. Thus, for example the target base station may indicate which, out of the configured component carriers, shall be used by the UE for the initial access by use of component carrier indexes or in another fashion. Component Carrier Information may be exchanged by the neighboring base station cells during the setup of the X2 interface between the two base station using Component Carrier Indexes or in another fashion. Component Carrier Indexes may be used simply for signaling purpose while configuring, activating and deactivating multiple carrier components.

In the above embodiments, a telephone based telecommunications system was described. As those skilled in the an will appreciate, the signalling and power control techniques described in the present application can be employed in any communications system. In the general case, the base stations and the UEs can be considered as communications nodes or devices which communicate with each other. Other communications nodes or devices may include user devices such as, for example, personal digital assistants, laptop computers, web browsers, etc.

In the above embodiments, a number of software modules were described. As those skilled will appreciate, the software modules may be provided in compiled or un-compiled form and may be supplied to the base station or to the UE as a signal over a computer network, or on a recording medium or may be directly installed or provided as firmware. Further, the functionality provided by part or all of this software may be provided by one or more dedicated hardware circuits or any suitable combination of two or more of software, firmware and hardware. However, the use of software modules is preferred as it facilitates the updating of base station 5 and the UEs 3 in order to update their functionalities. Similarly, although the above embodiments employed transceiver circuitry, at least some of the functionality of the transceiver circuitry may be provided by software or firmware or any suitable combination of two or more of software, firmware and hardware.

Various other modifications will be apparent to those skilled in the art and will not be described in further detail here.

Glossary of 3GPP Terms

LTE—Long Term Evolution (of UTRAN)
eNodeB—E-UTRAN Node B
UE—User Equipment—mobile communication device
DL—downlink—link from base to mobile
UL—uplink—link from mobile to base
MME—Mobility Management Entity
UPE—User Plane Entity
HO—Handover
RLC—Radio Link Control
RRC—Radio Resource Control
RRM—Radio Resource Management
SAE—System Architecture Evolution
C-RNTI—Cell-Radio Network Temporary Identifier
SIB—System Information Block
U-plane—User Plane
X2 Interface—Interface between two eNodeB
S1 Interface—Interface between eNodeB and MME
TA—Tracking Area
EPC—Evolved Packet Core
AS—Access Stratum
RNL—Radio Network Layer
TNL—Transport Network Layer
RACH—Random Access Channel
MU MIMO—Multi-User Multi Input Multi Output
DMRS—Demodulation Reference Signal Format
MCS—Modulation and Coding Scheme
E-RAB—Evolved Radio Access Bearer
PDCP-SN—Packet Data Convergence Protocol Sequence Number
RLC AM—Radio Link Control Acknowledge Mode
UL SDU—UpLink Service Data Unit
X2 ENB—X2 eNodeB The following is a detailed description of the way in which the present inventions may be implemented in the currently proposed 3GPP standard. Whilst various features are described as being essential or necessary, this may only be the case for the proposed 3GPP standard, for example due to other requirements imposed by the standard. These statements should not, therefore, be construed as limiting the present invention in any way.

1. INTRODUCTION

At the RAN 2 #66 bis meeting in Los Angeles, RAN2 discussed the issue of Connected Mode Mobility with Carrier Aggregation for LTE Advance. We had identified that some issues related to the measurement and have requested RAN 4 guidance on these issues. However apart from these issues we have also agreed that it shall be possible at intra-LTE handover to configure multiple CCs in the "handover command" for usage after the handover. In this contribution we focus on the handover signaling and discuss some additional information that would be needed in order to make the initial access in the target cell.

2. DISCUSSION

We have agreed that it shall be possible at intra-LTE handover to configure multiple CCs in the handover command for usage after the handover. We see that there are benefits of this approach as the target eNB shall not have to configure additional component carriers to the UE after the Handover. Although one may argue that the Target eNB may first configure only one component carrier for the UE. Subsequently, after the handover, the Target eNB may then configure additional component carriers to the UE. But with the second approach additional signaling would be needed in the target cell.

In the first approach where target eNB configures multiple carrier component during the handover it is reasonable to assume that the UE will perform initial access in the target cell only on one component carriers in the cell. Moreover when we will have multiple carrier components which are part of a cell we need to allocate dedicated preamble only from one of the component carrier for the UE to perform initial access.

For LTE advance we will probably need the concept of the Component Carrier Index which both the UE and the eNB can use for the signaling purpose while configuring, activating and deactivating multiple carrier components and also for indicating the component carrier on which the initial access is to be performed in the target cell after handover.

Proposal 1: For LTE advance we may need the concept of the Component Carrier Index which both the UE and the eNB can use for the signaling purpose while configuring, activating and deactivating multiple carrier components.

Proposal 2: When configuring multiple component carriers during handover, Target eNB also needs to indicate which, out of the configured component carrier, shall be used by the UE for the initial access and the dedicate preamble form same component carrier shall be allocated.

Further it is reasonable to assume that the Component Carrier Information of the neighboring eNB cells is exchanged during the setup of the X2 interface between the two eNB and the carrier component index are known in the neighboring eNB. Although this is a RAN 3 issue, but if we agree in RAN 2 to use this kind of approach it would be good to liaise with RAN 3 to have consistent definition on the Uu and X2 interface for the carrier component index.

Proposal 3: Component Carrier Information of the neighboring eNB cells is exchanged during the setup of the X2 interface between the two eNB and the carrier component index is known in the neighboring eNB. These carrier component indexes can be used for signaling on X2 and Uu interface.

Carrier index information can also be included in X2 ENB CONFIGURATION UPDATE and ENB CONFIGURATION UPDATE ACKNOWLEDGE in case the new carrier is added or existing one deleted.

3. CONCLUSIONS

In this paper we discuss what additional signaling details would be needed while configuring multiple component carriers during connected mode mobility and also for the details of how the UE connected node be assigned to monitor a subset of carriers. The main proposals of the contribution are Proposal 1: For LTE advance we tray need the concept of the Component Carrier Index which both the UE and the eNB can use for the signaling purpose while configuring, activating and deactivating multiple carrier components.

Proposal 2: When configuring multiple component carriers during handover, Target eNB also needs to indicate which, out of the configured component carrier, shall be used by the UE for the initial access and the dedicate preamble form same component carrier shall be allocated.

Proposal 3: Component Carrier Information of the neighboring eNB cells is exchanged during the setup of the X2 interface between the two eNB and the carrier component index is known in the neighboring eNB. These carrier component indexes can be used for signaling on X2 and Uu interface.

Carrier index information can also be included in X2 ENB CONFIGURATION UPDATE and ENB CONFIGURATION UPDATE ACKNOWLEDGE in case the new carrier is added or existing one deleted.

While this invention has been described in terms of the embodiment, this invention is not limited thereto. The structure and details of this invention can be applied with various changes that can be understood by a person skilled in the art within the sprit and scope of this invention described in the claims.

This application is based upon and claims the benefit of priority from United Kingdom Patent Application No. 0914353.8, filed on Aug. 17, 2009, the disclosure of which is incorporated herein in its entirety by reference.

The invention claimed is:

1. A mobile station comprising:
   a receiver configured to receive, from a source base station, a Radio Resource Control (RRC) connection reconfiguration message which comprises:
   first information which is related to a first component carrier of a plurality of component carriers to be used for initial access with a target base station, and
   second information which is related to a dedicated Random Access Channel (RACH) preamble; and
   a transmitter configured to perform the initial access with the target base station by using the first information and the second information,
   wherein the first information and the second information are transparently transferred to the mobile station by the source base station.

2. The mobile station of the claim 1, wherein the initial access is performed based on a contention-free procedure.

3. The mobile station of the claim 1, wherein the first information and the second information are transmitted from the target base station to the source base station by using a handover request acknowledgement message generated by the target base station.

4. A method performed by a mobile station, the method comprising:

receiving, from a source base station, a Radio Resource Control (RRC) connection reconfiguration message which comprises:

first information which is related to a first component carrier of a plurality of component carriers to be used for initial access with a target base station, and second information which is related to a dedicated Random Access Channel (RACH) preamble; and performing the initial access with the target base station by using the first information and the second information, wherein the first information and the second information are transparently transferred to the mobile station by the source base station.

5. The method of the claim 4, wherein the initial access is performed based on a contention-free procedure.

6. The method of the claim 4, wherein the first information and the second information are transmitted from the target base station to the source base station by using a handover request acknowledgement message generated by the target base station.

7. A target base station comprising:

a receiver configured to receive a handover request message from a source base station;

a transmitter, to the source base station, configured to transmit a handover acknowledgement message which comprises:

first information which is related to a first component carrier of a plurality of component carriers to be used for initial access with a target base station, and second information which is related to a dedicated Random Access Channel (RACH) preamble, and a controller configured to allow the initial access by the mobile station by using the first information and the second information, wherein the first information and the second information are transparently transferred to the mobile station by the source base station.

8. The target base station of the claim 7, wherein the initial access is performed based on a contention-free procedure.

9. The target base station of the claim 7, wherein the handover request acknowledge message is generated by the target base station.

10. A method performed by a target base station, the method comprising:

receiving a handover request message from a source base station transmitting, to the source base station, a handover acknowledgement message which comprises:

first information which is related to a first component carrier of a plurality of component carriers to be used for initial access with a target base station, and second information which is related to a dedicated Random Access Channel (RACH) preamble, and allowing the initial access by the mobile station by using the first information and the second information, wherein the first information and the second information are transparently transferred to the mobile station by the source base station.

11. The method of the claim 10, wherein the initial access is performed based on a contention-free procedure.

12. The method of the claim 10, wherein the handover request acknowledge message is generated by the target base station.

* * * * *